(12) United States Patent
Edwards et al.

(10) Patent No.: US 10,042,451 B2
(45) Date of Patent: Aug. 7, 2018

(54) TOUCH DISPLAY DEVICE COMPRISING SENSE ELECTRODE WITH SUB-ELECTRODES EXTENDING ALONG A FIRST DIRECTION DEFINING A PITCH BETWEEN SUB-ELECTRODES

(71) Applicant: INNOLUX CORPORATION, Chu-Nan, Miao-Li County (TW)

(72) Inventors: Martin John Edwards, Chu-Nan (TW); John Richard Ayres, Chu-Nan (TW); Nicola Bramante, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 0 days.

(21) Appl. No.: 14/954,818

(22) Filed: Nov. 30, 2015

(65) Prior Publication Data

US 2016/0085350 A1    Mar. 24, 2016

Related U.S. Application Data

(63) Continuation of application No. 12/433,513, filed on Apr. 30, 2009, now abandoned.
(Continued)

(30) Foreign Application Priority Data

Feb. 12, 2009    (EP) .................... 09152695

(51) Int. Cl.
*G06F 3/041* (2006.01)
*G06F 3/044* (2006.01)
*G06F 3/047* (2006.01)

(52) U.S. Cl.
CPC ............ *G06F 3/0412* (2013.01); *G06F 3/044* (2013.01); *G06F 3/047* (2013.01)

(58) Field of Classification Search
CPC ...... G06F 3/041; G06F 3/0412; G06F 3/0416; G06F 3/044; G06F 3/047; G06F 3/046; G06F 3/048
(Continued)

(56) References Cited

U.S. PATENT DOCUMENTS

| 4,321,567 A | 3/1982 | Sandy |
|---|---|---|
| 5,534,892 A | 7/1996 | Tagawa |

(Continued)

FOREIGN PATENT DOCUMENTS

| CN | 1942853 | 4/2007 |
|---|---|---|
| EP | 1835382 | 9/2007 |

(Continued)

*Primary Examiner* — Alexander Eisen
*Assistant Examiner* — Nelson Lam
(74) *Attorney, Agent, or Firm* — Liu & Liu

(57) ABSTRACT

A touch sensor input device includes a first and second array of electrodes, the electrodes in the first array being orthogonal to the electrodes in the second array. A capacitor sensing arrangement senses an electrode capacitance signal which varies in the presence of a touch input. The capacitance signals for groups of electrodes in each array are combined in order to derive respective individual sense signals. This arrangement has electrodes with a finer resolution than the sensing resolution, and this gives improved ability to sense accurately the position of the touch input.

9 Claims, 15 Drawing Sheets

Related U.S. Application Data

(60) Provisional application No. 61/125,917, filed on Apr. 30, 2008, provisional application No. 61/125,963, filed on Apr. 30, 2008.

(58) Field of Classification Search
USPC .................................. 345/173–179
See application file for complete search history.

(56) References Cited

U.S. PATENT DOCUMENTS

| | | | |
|---|---|---|---|
| 5,650,597 | A | 7/1997 | Redmayne |
| 5,790,106 | A | 8/1998 | Hirano et al. |
| 6,730,863 | B1 | 5/2004 | Gerpheide et al. |
| 8,547,344 | B2* | 10/2013 | Whight .................. G06F 3/044 345/173 |
| 2006/0007165 | A1* | 1/2006 | Yang ..................... G06F 3/0412 345/173 |
| 2007/0074914 | A1 | 4/2007 | Geaghan et al. |
| 2007/0109274 | A1 | 5/2007 | Reynolds |
| 2007/0132737 | A1* | 6/2007 | Mulligan ............. G06F 3/0418 345/173 |
| 2007/0146283 | A1* | 6/2007 | Hong ................... G09G 3/007 345/98 |
| 2007/0242003 | A1* | 10/2007 | Vogel .................. G09G 3/3216 345/76 |
| 2008/0062140 | A1 | 3/2008 | Hotelling et al. |
| 2008/0062148 | A1 | 3/2008 | Hotelling et al. |
| 2008/0084402 | A1 | 4/2008 | Tatcuchi et al. |
| 2008/0231607 | A1 | 9/2008 | Utsunomiya et al. |
| 2008/0278458 | A1 | 11/2008 | Masuzawa et al. |
| 2008/0297174 | A1 | 12/2008 | Narasimhan et al. |
| 2008/0309633 | A1* | 12/2008 | Hotelling ............. G06F 3/0412 345/173 |
| 2010/0060596 | A1 | 3/2010 | Whight |
| 2010/0085322 | A1 | 4/2010 | Mamba et al. |
| 2010/0214247 | A1 | 8/2010 | Tang et al. |
| 2011/0102353 | A1* | 5/2011 | Kim ........................ G06F 3/041 345/173 |
| 2012/0075232 | A1* | 3/2012 | Golovchenko ......... G06F 3/044 345/174 |

FOREIGN PATENT DOCUMENTS

| | | |
|---|---|---|
| EP | 1837742 | 9/2007 |
| JP | 01-209521 | 8/1989 |
| JP | 9-511086 | 11/1997 |
| JP | H10-20992 | 1/1998 |
| JP | 11110115 | 4/1999 |
| JP | 2007-179561 | 7/2007 |
| JP | 2007-257164 | 10/2007 |
| WO | 2004/021051 | 3/2004 |
| WO | 2006/126604 | 11/2006 |

* cited by examiner

TOUCH DISPLAY DEVICE COMPRISING SENSE ELECTRODE WITH SUB-ELECTRODES EXTENDING ALONG A FIRST DIRECTION DEFINING A PITCH BETWEEN SUB-ELECTRODES

CROSS REFERENCE TO RELATED APPLICATIONS

This application claims the benefit of priority from, and is a continuation application of, U.S. patent application Ser. No. 12/433,513 filed on Apr. 30, 2009, entitled "TOUCH INPUT DEVICE", which claims the benefit of U.S. Provisional Application No. 61/125,917, filed on Apr. 30, 2008, and U.S. Provisional Application No. 61/125,963, filed on Apr. 30, 2008, the entirety of which are incorporated by reference herein.

This application claims the benefit of priority from, and is a continuation application of, U.S. patent application Ser. No. 12/433,513 filed on Apr. 30, 2009, entitled "TOUCH INPUT DEVICE", which claims the benefit of EP Patent Application No. 09152695.4, filed on Feb. 12, 2009, the entirety of which is incorporated by reference herein.

BACKGROUND OF THE INVENTION

Field of the Invention

This invention relates to touch input devices, for example for use in display devices with touch screens.

Description of the Related Art

Touch screens are becoming increasingly common in consumer electronics applications where an LCD display is present in a device e.g. mobile phone, PDA or camera. User interaction via a touch screen saves the space required for key inputs and therefore allows a larger display area for a given size of device. The touch screen provides a 2D position sensing function, and it can be used generally as a means of controlling or interacting with devices.

Of the possible physical effects used to locate the "touched" position on such a screen, sensing the capacitance change induced between orthogonal sets of electrodes, or between a grounded stylus and individual electrodes, promises the highest resolution whilst integrating most easily with existing manufacturing processes.

Typically the electrodes of a high resolution 2D capacitance sensor are laid out in a matrix pattern of intersecting orthogonal electrodes, indicated as electrodes $10a$ and $10b$ in FIG. 1. The electrodes may be formed using two isolated layers of a transparent conducting material such as indium tin oxide (ITO). As the object moves over the electrodes, the capacitance between the electrodes and the object and the capacitance between the electrodes varies. Sensing circuits which connect to the electrodes are able to detect changes in these capacitances which can then be interpreted to determine the position of the object.

Typically position sensors are combined with displays in the form of an overlay providing touch or stylus input. Sensors based on capacitance sensing consist of sets of electrodes which are connected to drive and/or sensing circuits. The location of an object, for example a stylus or a finger, is detected by measuring changes in the capacitances associated with the electrodes and the object.

In FIG. 1, the electrodes are shown as narrow lines, however the outline of the electrodes may be varied depending on the detailed operation of the sensor. For example in order to increase the capacitances between the sense electrodes and the object it may be preferable to use wider electrodes for example as shown in FIG. 2.

In this case, the electrodes consist of diamond shapes which are joined at their vertices to form horizontal and vertical sense electrodes.

The electrodes are in the form of straight electrode lines $20a,20b$, with enlarged diamond shaped portions $22a,22b$ along the lines. The pitch of the diamonds $22a,22b$ (i.e. the distance between the diamond centers) corresponds to the pitch of the electrode lines of the other array, so that a regular array is defined.

The area presented by the electrodes is substantially increased compared to FIG. 1 resulting in higher capacitance values which can be more easily measured.

In the case where the sensor is combined with a matrix display device, the number of sense electrodes is likely to be lower than the number of rows and columns of pixels within the display but interpolation techniques can be used to determine the position of the object when it lies at intermediate positions between the centers of the sense electrodes.

A concern that arises when locating sense electrode structures in the optical path of a matrix display device is that the pattern of the sense electrodes may be visible as a variation of brightness over the surface of the display. For example, a conducting layer of ITO might typically have a transmission of 95%. Brightness variations of only 1% can be seen by the eye particularly when they have a linear or repetitive structure making it likely that under some circumstances the electrode pattern will be visible to the person viewing the display. The presence of the sense electrodes may therefore degrade the quality of the displayed images particularly when moving images are being viewed.

A further concern is that when the object to be sensed is significantly smaller than the sense electrode pitch, this will affect the way in which the capacitance values change with the position of the object, making it difficult to uniquely locate the position of the object when it is centered on one of the sense electrodes.

For example, FIG. 3 shows in more detail part of the electrode layout and the corresponding cross section is shown in FIG. 4.

FIG. 3 shows a line X-X along the center of one of the electrode rows. When the stylus 40 is located at the center of the line X-X as indicated in FIG. 4 (i.e. at the middle of one of the diamonds in the row direction electrodes $30b$, $32b$), it will have a relatively large effect on the capacitances associated with the row direction sense electrodes $30b,32b$ (these will be termed B electrodes in the following description) but a much smaller effect on the capacitances associated with the adjacent column electrodes $30a,32a$ (these will be termed A electrodes in the following description). This may make it difficult to detect the location of the stylus on one set of electrodes, for example the A electrodes, when the stylus is centered over one of the other set of electrodes, for example the B electrodes. In particular, from this starting point, movement of the stylus along the column direction has much less effect on the capacitance than movement of the stylus along the row direction.

This is illustrated graphically by FIG. 5 which shows an estimate of the capacitance between a stylus and the sense electrodes when moving either side of the center of the line X-X. Curve 50 represents the capacitance between the stylus and the B (row) electrode and the curves 52 and 54 represent the capacitance between the stylus and the two A (column) electrodes to either side.

For the graph of FIG. 5, it is assumed that the stylus 40 has a tip diameter of 1 mm and the diamond shapes of the sense electrode arrangements have a side with a length of 4.2 mm (this is dimension L shown in FIG. 3).

In FIG. 5, the x-axis shows the position along the line X-X. Position 0 corresponds to the center of a diamond 32*b* (as shown in FIG. 4). Thus, this position corresponds to the maximum capacitance to the row direction sense electrodes 30*b*,32*b*. When moving to the side, the capacitance to the row direction sense electrode drops (curve 50), but the capacitance one of the column direction sense electrodes increases (curves 52 and 54).

It can be seen that when the stylus 40 is centered on the line X-X, the capacitance between the stylus and the adjacent A electrodes falls to a low level as most of the electric field lines between the stylus and the sense electrode terminate on the B sense electrode. This will make it difficult to detect which of the A electrodes the object is closest to.

In general, the way in which the capacitances associated with the sense electrodes vary with the position of the object depends on the dimensions and the shape of the sense electrodes. However, the electrode shape required to produce the desired sensor characteristics may not be consistent with the pattern required to minimize the visibility of the sense electrodes. Reducing the visibility of the electrodes is particularly important when the sensor is combined with a display device.

SUMMARY OF THE INVENTION

According to the invention, there is provided a display device with touch sensor input, the display device comprising an array display pixels or an array of display sub-pixels with groups of sub-pixels together defining respective display pixels, the device comprising: a display layer; and a touch sensor input device over the display layer for enabling a touch input to the device, wherein the touch sensor input device comprises: a first and second array of electrodes, the electrodes in the first array being orthogonal to the electrodes in the second array; and a capacitor sensing arrangement for sensing an electrode capacitance signal which varies in the presence of the touch input, wherein the electrode capacitance signals for groups of the electrodes in each array are combined in order to derive respective individual sense signals, wherein the pitch of the electrodes of the first and second array is the same as a pixel or sub-pixel pitch of the display device.

In one example, each group of electrodes comprises an adjacent group of electrodes. This means that each sense electrode is effectively an arrangement of electrodes spread over an area using a higher resolution array of electrodes. The high resolution electrodes can thus be considered to be sub-electrodes. Because these sense sub-electrodes have a finer resolution than the resolution being sensed (for example finer than size of the object being detected), there is a more gradual shift in capacitance change from one sense electrode arrangement to the next as the input moves. However, the sense electrode arrangements can still occupy a small area and therefore the effect of the touch sensor device on the output of an underlying display device can be minimized. The touch sensor capacitance signal is stronger when the input position is between sense electrode arrangement positions.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 2:
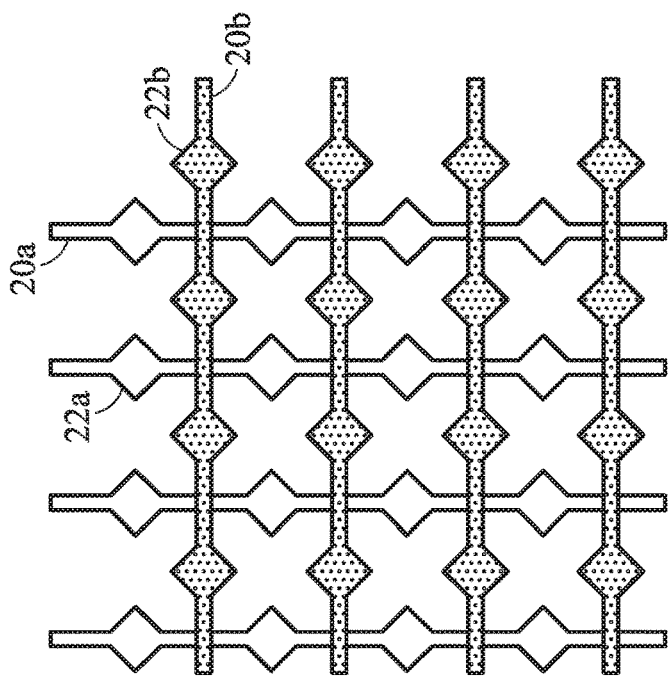
FIG. 2 shows a second known arrangement of electrodes for a touch sensor device.

The following description is of the contemplated mode of carrying out the invention. This description is made for the purpose of illustrating the general principles of the invention and should not be taken in a limiting sense. The scope of the invention is determined by reference to the appended claims.

Wherever possible, the same reference numbers are used in the drawings and the descriptions to refer to the same or like parts.

The invention provides a touch sensor input device in which capacitive sensing electrodes are arranged as connected groups of electrodes, so that the individual electrodes have smaller pitch than the sensing resolution. This improves the ability to determine uniquely the location of a touch input for all positions. The smaller electrode pitch matches the design of the display, so that visual artefacts caused by the sense electrode structure are reduced.

Figure 6:
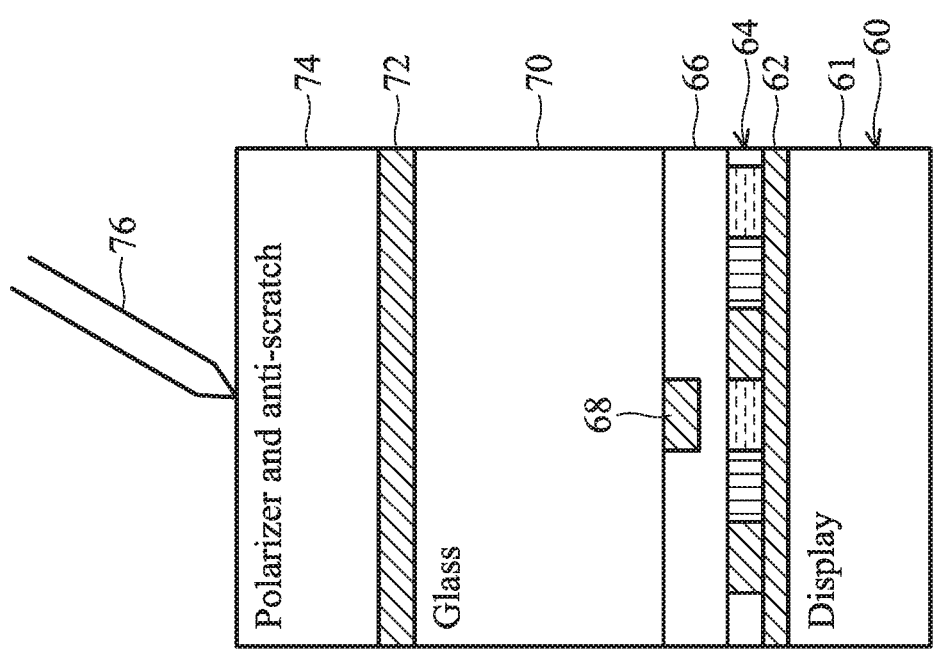
FIG. 6 shows one example of known structure for a display device with touch sensor input and to which the invention can be applied.

Before explaining the invention in detail, an example will be provided of the type of device to which the invention can be applied. FIG. 6 shows one example of known layer structure for a display device with capacitance touch sensor input and to which the invention can be applied.

Part of the display is shown schematically as 60, and this includes at least a display layer. The precise design of display panel is not material to the invention, and for this reason, a detailed description of the display panel is not provided. Typically, the display structure is a liquid crystal display comprising a layer of liquid crystal material sandwiched between substrates. For active matrix displays, the substrates comprise a lower active plate and an upper passive plate. The passive plate for example carries a common electrode. The common electrode is shown as 62, and is a common ground plane in the form of a transparent conducting layer that is present on the colour filter layer 64. Below the common electrode 62 is the layer of liquid crystal sitting on the active glass plate, indicated generally as reference 61.

Above the colour filter layer 64 is a combination of a planarising dielectric layer 66 and the Y-sense electrode arrangements 68 for the touch sensor.

The layers 62,64,66,68 are, in practice, deposited on the substrate 70. The top substrate 70 thus functions as the top passive plate for the display device as well as the support structure for the touch sensor device.

The X sense electrode arrangements 72 are provided on the opposite side of the substrate 70 to the Y sense electrode arrangements 68, and a light polarising layer and an anti scratch layer 74 are provided as the top surface. These are conventional layers for LCD touch screens. The stylus or finger that provides the user touch interaction touches the surface of the anti scratch layer and is shown as 76.

FIG. 6 thus shows a display structure with a touch sensor structure on top of the display structure. It will be appreciated that some components of the display structure are integrated with the touch sensor, such as the glass substrate 70, light polarizing layer, anti scratch layer 74 and colour filters 64. Thus, the structure does not have separately defined display parts and touch sensor parts. However, the general display function (i.e. modulation or production of light) is beneath the general touch sensor function, and the description and claims should be understood accordingly.

FIG. 6 represents just one possible integrated structure. A further level of integration would be to move the X sense electrode arrangements inside the display (i.e. between the substrates). However this would reduce the influence of the stylus on the XY capacitance. FIG. 6 represents the first step towards integrating the touch sensor into the display, but the invention applies equally to designs with a greater level of integration of the touch sensor function with the display function.

Figure 1:
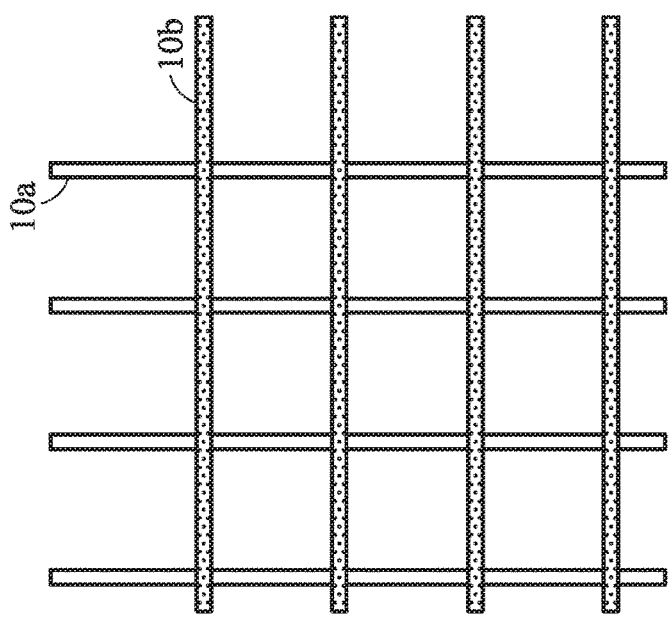
FIG. 1 shows a first known arrangement of electrodes for a touch sensor device.
Figure 4:
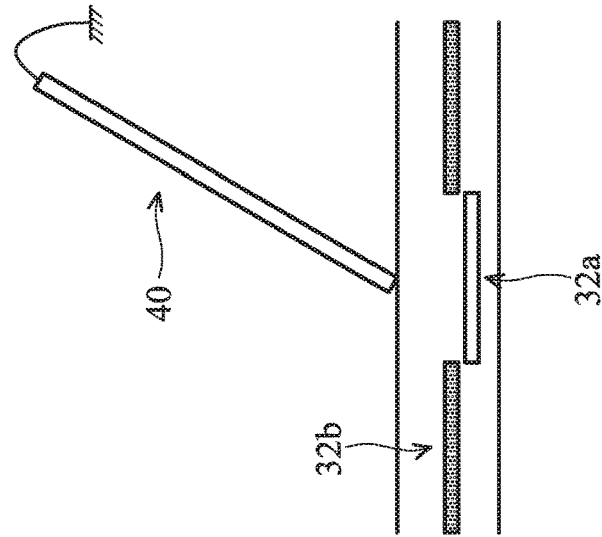
FIG. 4 shows how the input device interacts with the touch sensor device, again to explain a problem with the arrangement of FIG. 2.
Figure 3:
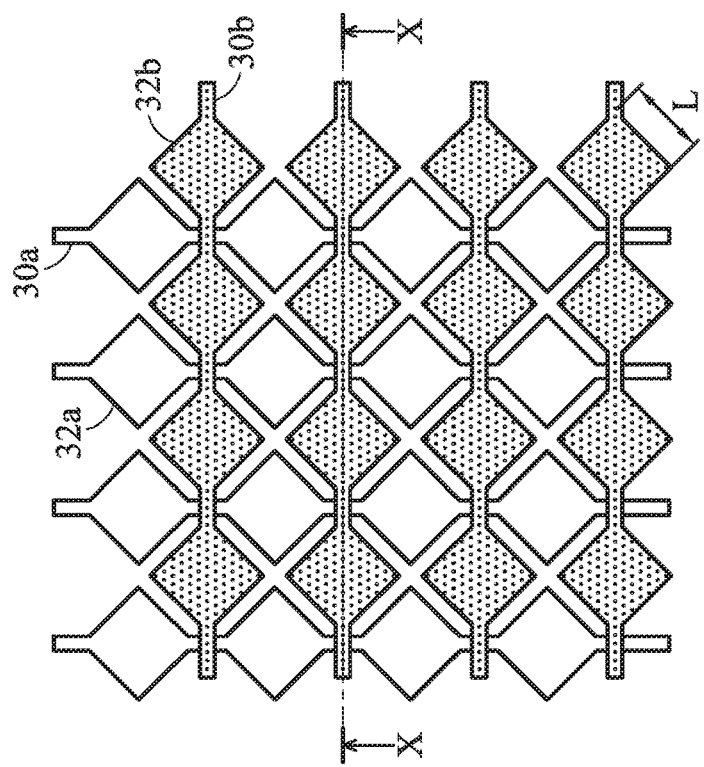
FIG. 3 shows a portion of FIG. 2 and is used to explain a problem with the arrangement of FIG. 2.
Figure 5:
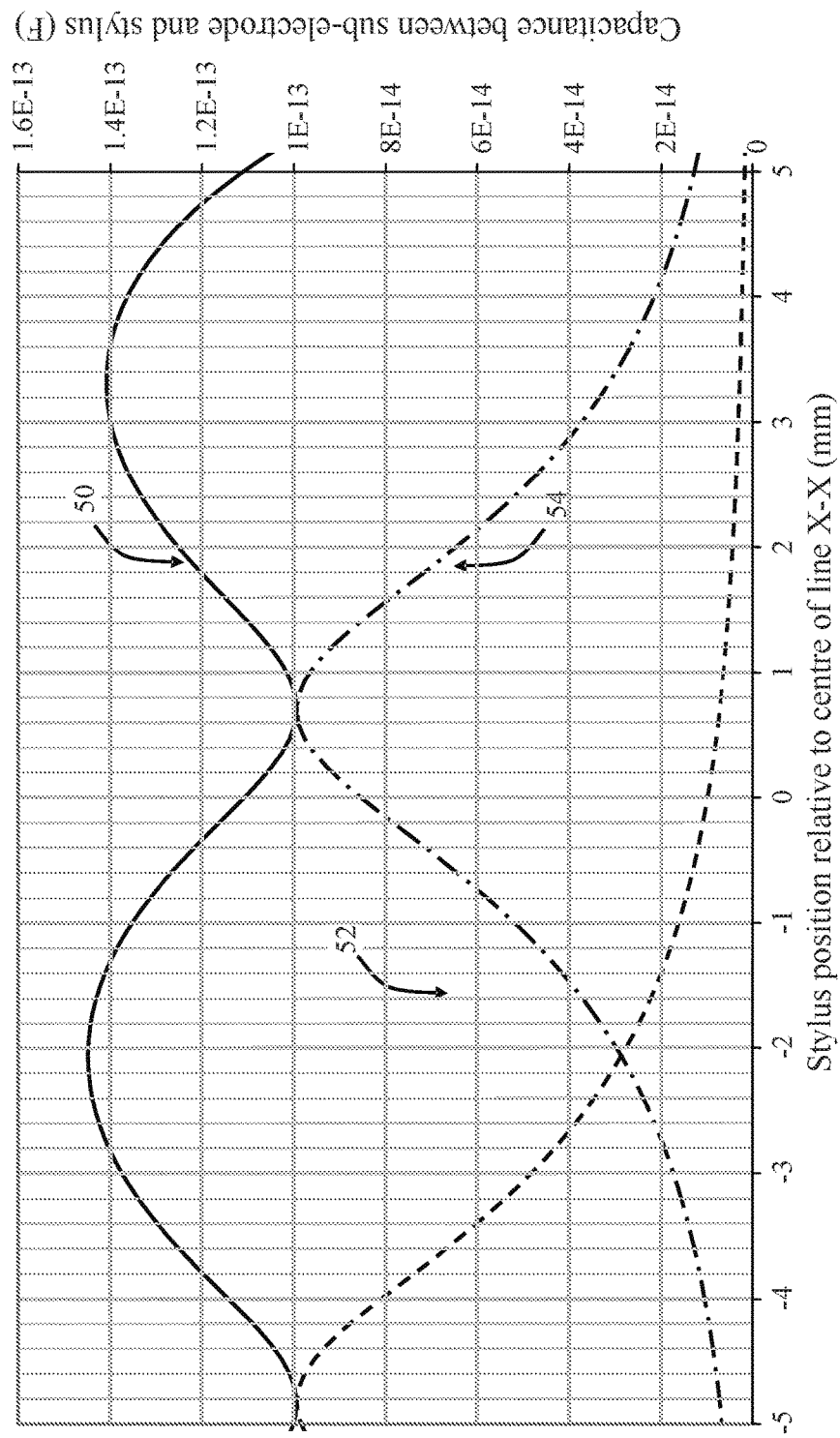
FIG. 5 is a graph to explain the problem with the arrangement of FIG. 2.
Figure 7:
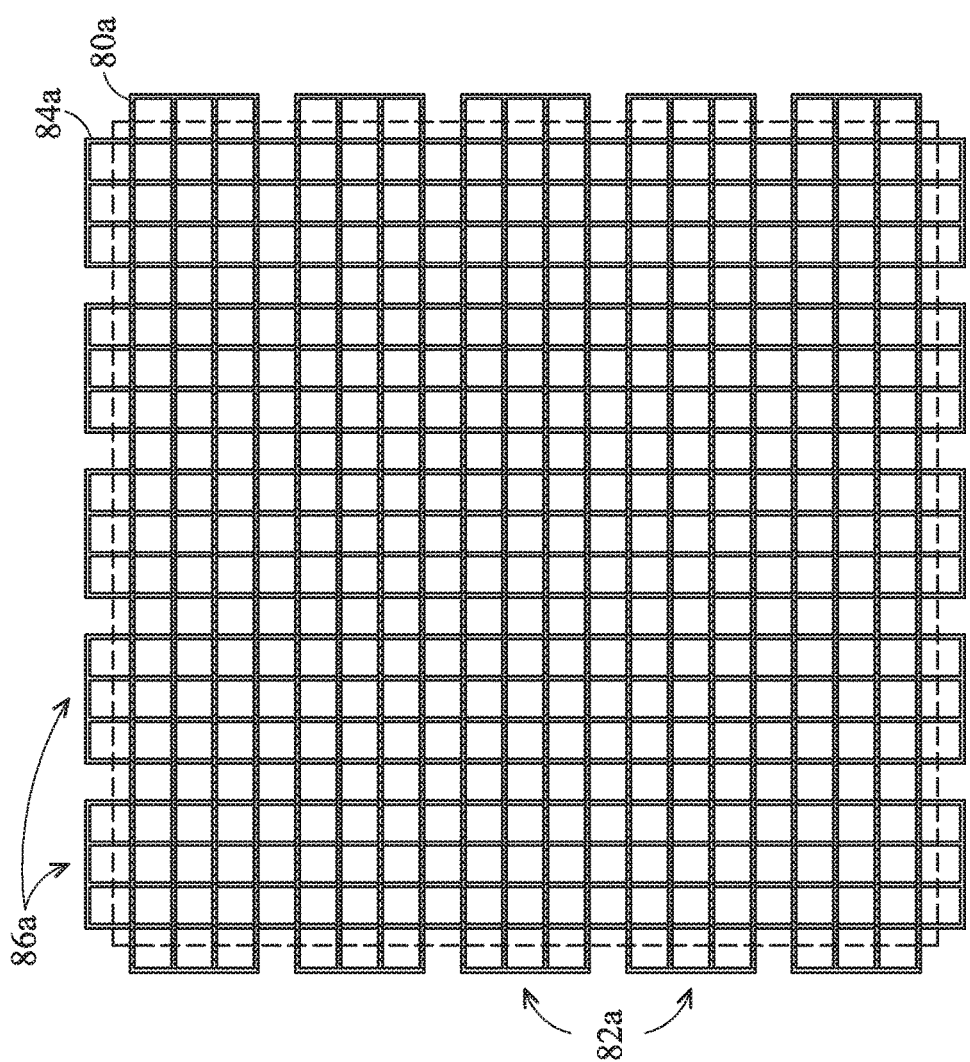
FIG. 7 shows a first arrangement of electrodes for a touch sensor device of the invention.
Figure 8:
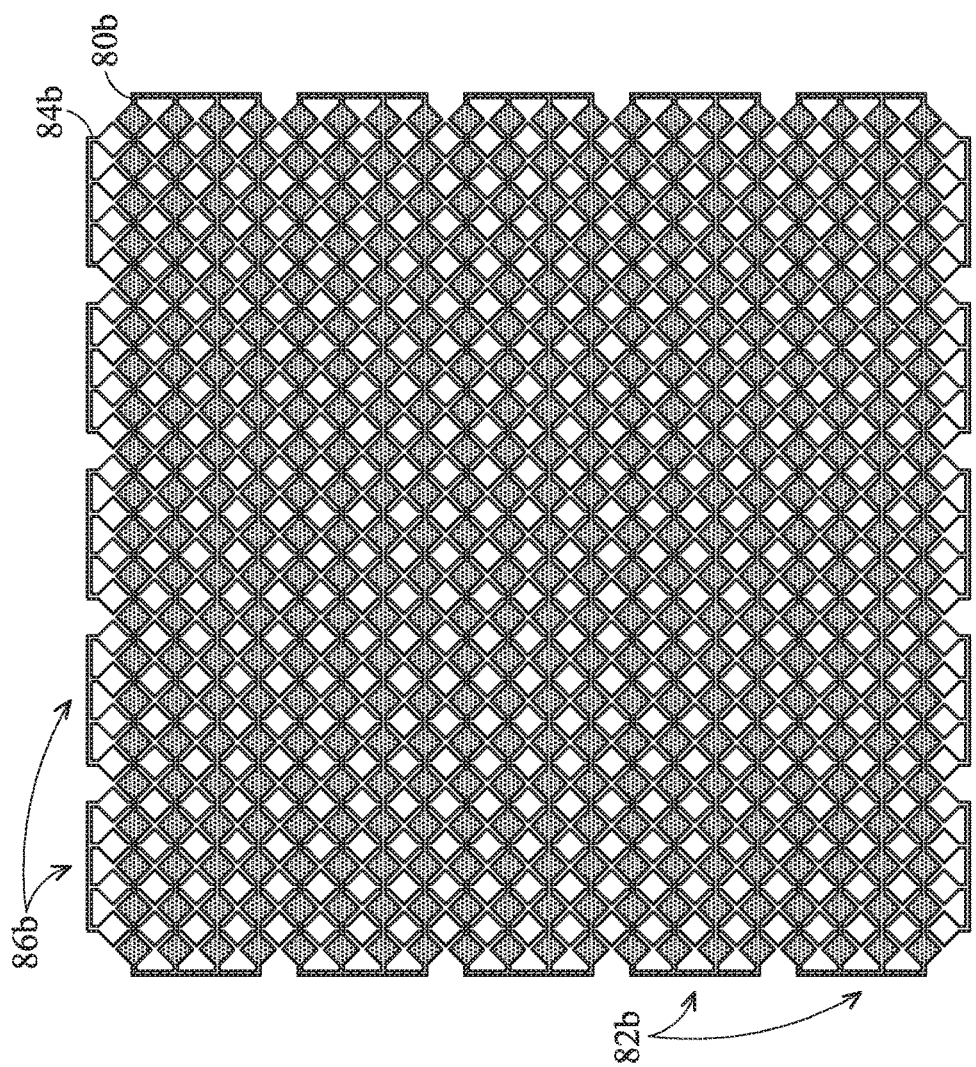
FIG. 8 shows a second arrangement of electrodes for a touch sensor device of the invention.

A first way in which the proposed method is applied to the sense electrode structures of FIG. 1 and FIG. 2 is illustrated in FIG. 7 and FIG. 8. In these examples, each sense electrode arrangement is made up of a connected group of four sub-electrodes, although in practice a larger number of sub-electrodes may be used. The connection between the electrodes of the group can be by a physical electrical connection as shown in FIGS. 7 and 8.

The structure of the sub-electrodes is shown as being similar to that of the original sense electrodes although this does not have to be the case. Sensing electrodes are created by electrically connecting groups of adjacent sub-electrodes at the periphery of the sensing area. The position of an object can be determined by comparing the capacitances associated with the vertical A electrodes 84a or 84b in order to determine the horizontal position and by comparing the capacitances associated with the horizontal B electrodes 80a or 80b in order to determine the vertical position of the object.

FIG. 7 shows individual horizontal (i.e. row) electrodes 80a in the form of bars, which are connected in groups 82a. Each individual horizontal electrode can be considered as a sub-electrode, and each group 82a can be considered as a combined sense electrode arrangement or structure. Likewise, the individual vertical (i.e. column) electrodes 84 are connected in groups 86a.

FIG. 8 shows individual horizontal (i.e. row) electrodes in the form of bars with diamonds (as shown in FIG. 2), which are again connected in groups 82b, and the individual vertical (i.e. column) electrodes 84b in the form of bars with diamonds also connected in groups 86b.

Figure 9:
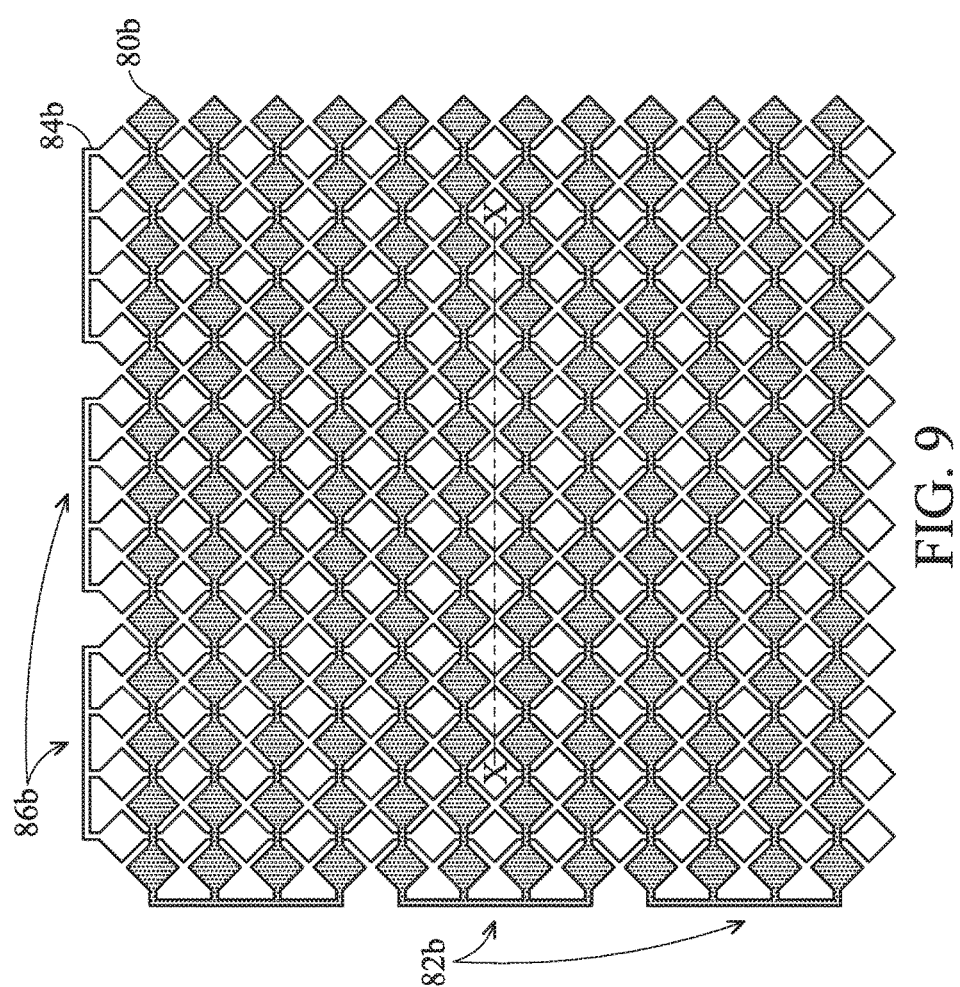
FIG. 9 shows a portion of FIG. 8 and is used to explain the advantage of the invention.
Figure 10:
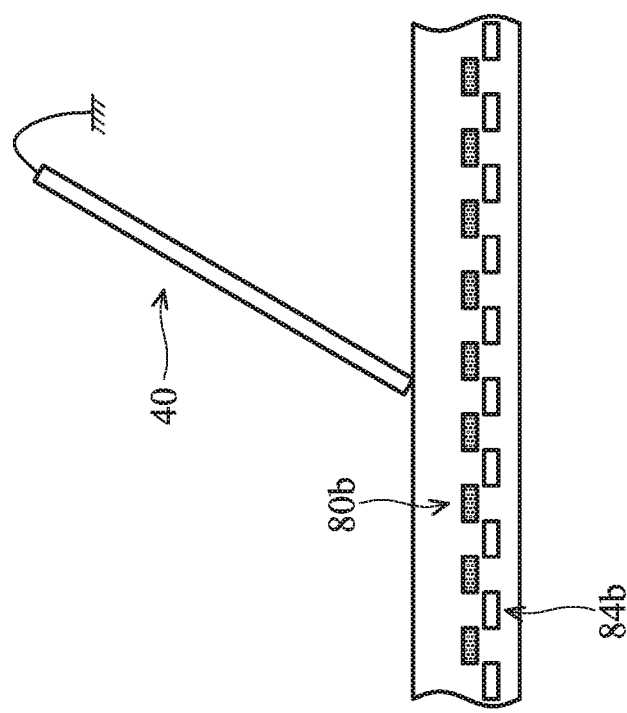
FIG. 10 shows how the input device interacts with the touch sensor device, again to explain the advantage of the invention.
Figure 11:
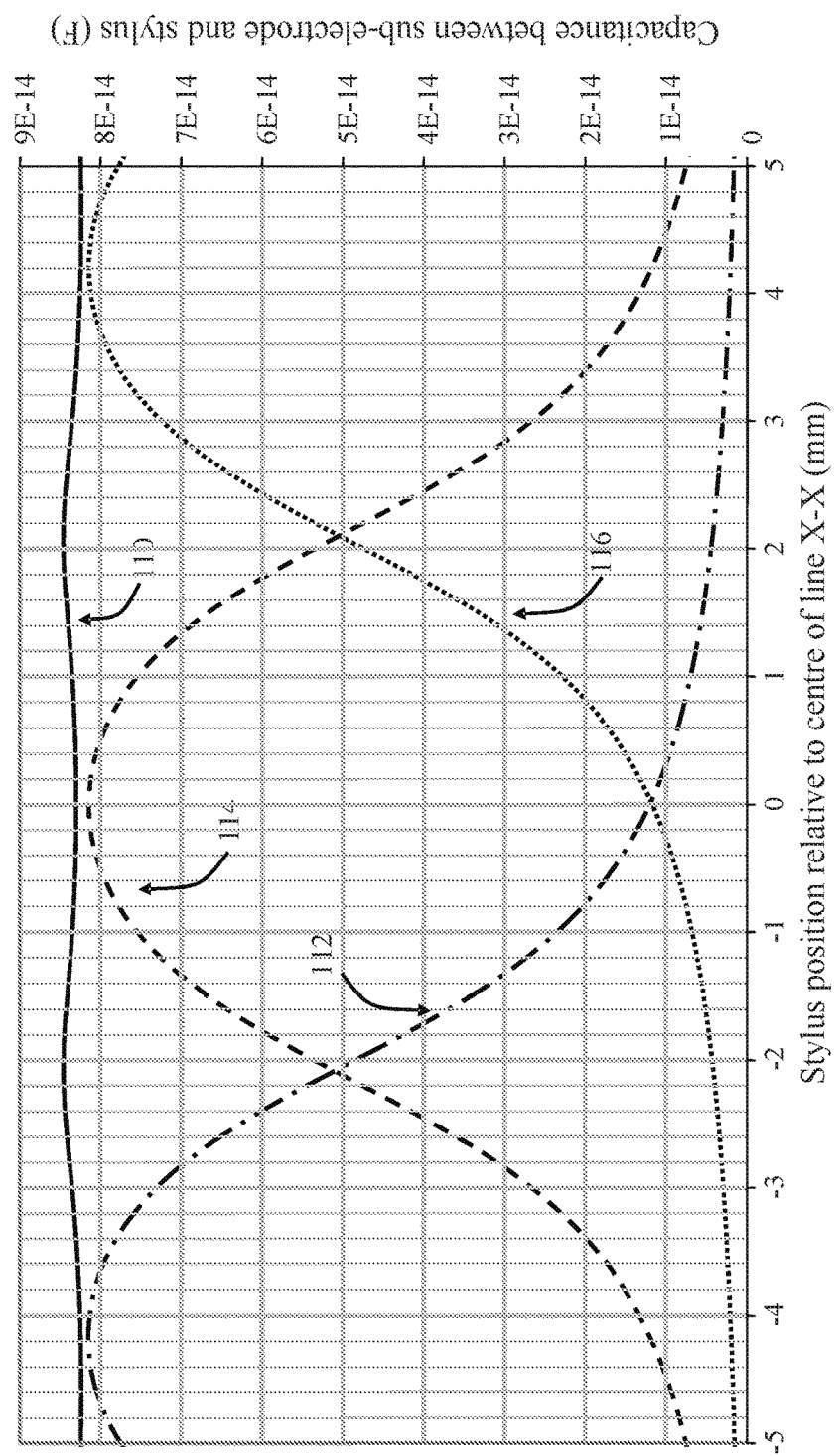
FIG. 11 is a graph to explain the advantage of the invention.

The benefit of the use of sub-electrodes is illustrated by FIGS. 9, 10 and 11.

FIG. 9 shows an enlarged portion of the arrangement of FIG. 8, and shows the axis X-X along which stylus movement is modelled. A cross section of the sense electrode structure is illustrated in FIG. 10, showing the stylus 40 and individual sub-electrodes 80b,84b.

FIG. 11 shows how the estimated capacitance between a stylus and the sense electrode arrangements varies with the position of the stylus 40 (as shown in FIG. 10) along the line X-X shown in FIG. 9.

As the stylus is moved along the line X-X, there is no significant change in the capacitance between the stylus and the group 82b of horizontal electrodes (which group functions as a row sense electrode arrangement) as indicated by the curve 110, whereas the capacitance to three sequential groups 86b of vertical electrodes (which group functions as a vertical sense electrode arrangement) varies smoothly with a significant capacitance to at least one of the electrodes for all positions. The plots for three adjacent vertical sense electrode arrangements are shown as plots 112,114,116.

Figure 12:
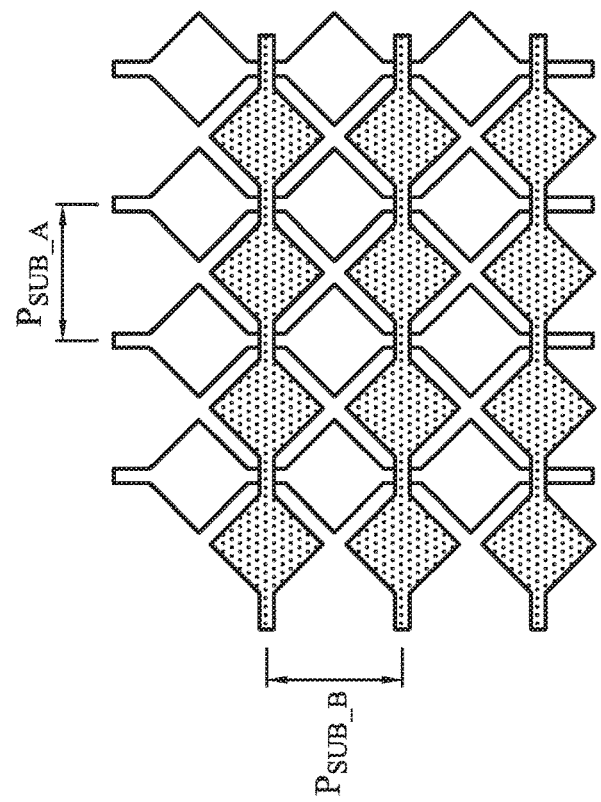
FIG. 12 defines the pitches of the sensor electrodes of the invention.

The repeat pitch of the sub-electrode pattern is shown in FIG. 12 as $P_{SUB\_A}$ in the horizontal direction and $P_{SUB\_B}$ in the vertical direction. When the electrodes are formed in front of a display, the pitch of the sub-electrodes is matched to the repeat pitch of the display pixels. This reduces image artefacts, as all pixels are then affected equally.

Figure 13:
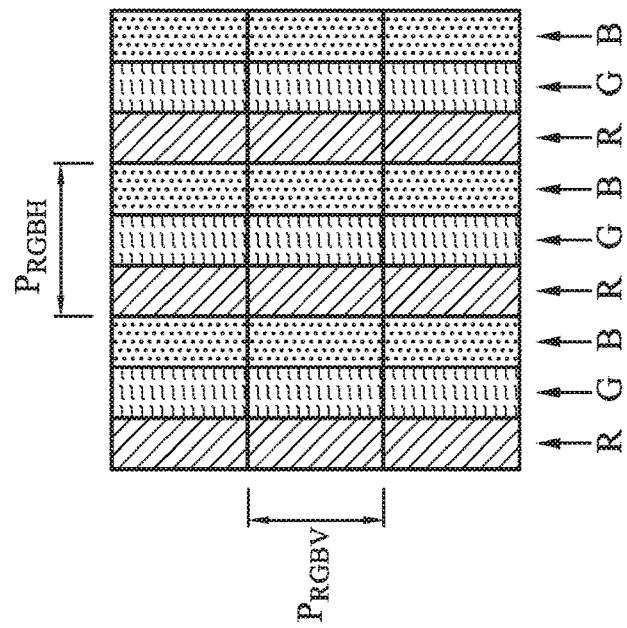
FIG. 13 shows how the pitches of the sensor electrodes of the invention can be matched to a colour filter arrangement.

FIG. 13 shows a possible layout for the colour pixels of an active matrix display with a repeat pitch of $P_{RGBH}$ in the horizontal direction and $P_{RGBV}$ in the vertical direction. The colour pixels are arranged as red (R), green (G) and blue (B) columns of pixels. In order to minimize the visibility of the capacitance sensor electrodes, the pitches of the sub-electrode pattern and the display pixel pattern should be matched so that $P_{SUB\_A}=P_{RGBH}$ and $P_{SUB\_B}=P_{RGBV}$.

In the examples above, adjacent sub-electrodes are formed into groups. An alternative approach is for the grouping of the sub-electrodes to be changed in order to modify the characteristics of the capacitance sensor, namely how the capacitances which are measured by the sensor vary with the properties of the objects to be sensed such as size and position.

Figure 14:
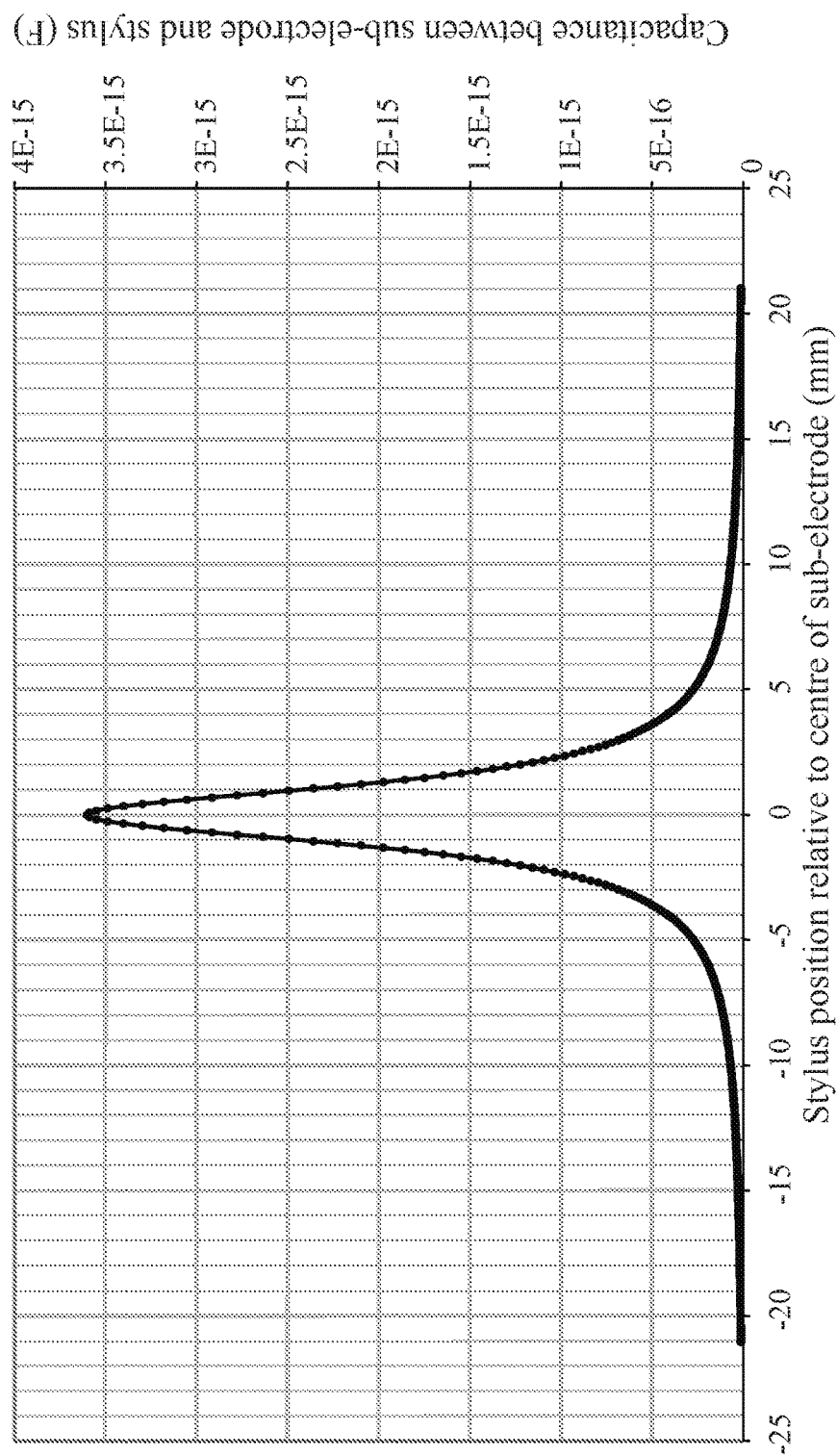
FIG. 14 shows how the capacitance between a stylus and a single sub-electrode varies with the position of the stylus relative to the center of the sub-electrode.

To illustrate this approach, a sensor is considered based on measurement of the capacitance between the sense electrodes and the object to be sensed such as a stylus or finger (as opposed to measurement of the capacitance between sense electrodes). The sub-electrodes can be arranged in a grid pattern such as that illustrated in FIG. 1 or 2. When the object, for example a grounded conducting stylus, is brought close to one of the sense electrodes the capacitance between the sense electrode and that object increases. This is illustrated in FIG. 14 which shows an estimate of how the capacitance between a stylus and a single sub-electrode varies with the position of the stylus relative to the center of the sub-electrode on an axis which is perpendicular to the sub-electrode.

As the stylus moves towards the sub-electrode the capacitance increases reaching a peak when the stylus is directly over the sub-electrode. In this example, the width of the sub-electrode is approximately 0.1 mm and the diameter of the stylus is 1.5 mm.

Adjacent sub-electrodes have a similar variation of capacitance to the stylus with stylus position but offset by a distance corresponding to the separation of the sub-electrodes. Each sense electrode can be formed by electrically connecting a respective group of sub-electrodes as explained above. The variation of capacitance between the sense electrode and the stylus with the position of the stylus relative to the center of the sense electrode can be then be obtained by summing the contributions to the capacitance from the sub-electrodes within the group.

Figure 15:
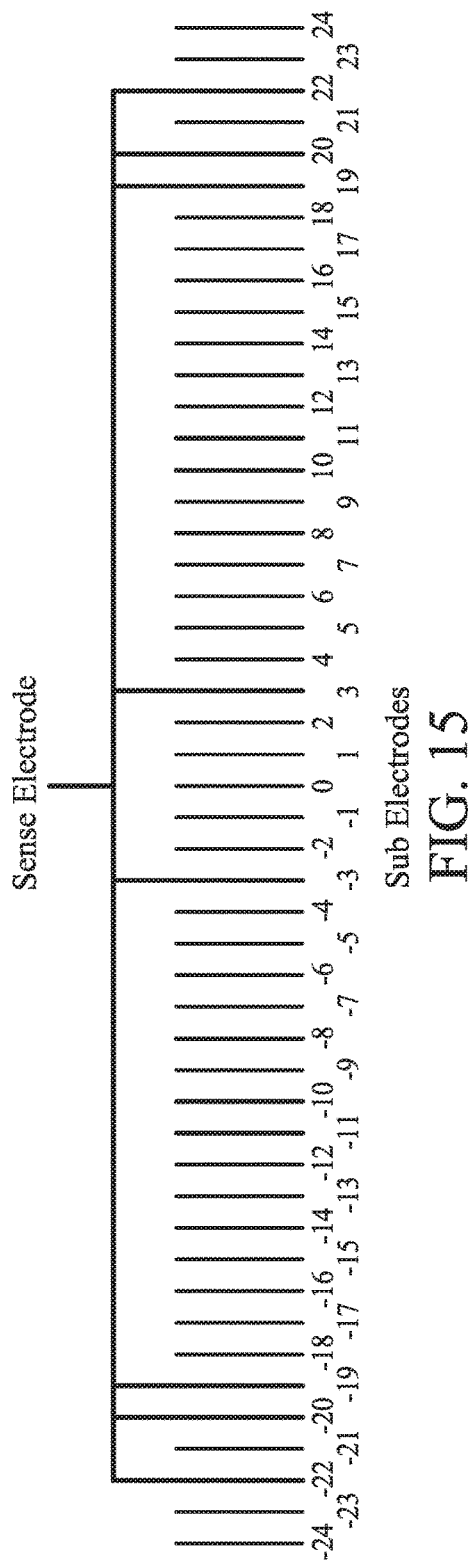
FIG. 15 shows an example of a sub-electrode grouping of the invention which is not based on adjacent groups of sub-electrodes.

FIG. 15 shows an example of a sub-electrode grouping which is not based on adjacent groups of sub-electrodes, but instead takes a set of sub-electrodes so that a desired capacitance function is obtained. The sub-electrodes are numbered in FIG. 15 relative to the center sub-electrode, with sub-electrodes having a positive index on the right and sub-electrodes having a negative index on the left.

The sense electrode which is centered on sub-electrode 0 is formed by connecting sub-electrodes +3, −3, +19, −19, +20, −20, +22 and −22. The variation of the capacitance between the sense electrode and the stylus depending on the stylus position relative to the center of sub-electrode 0 is shown in FIG. 16.

Figure 16:
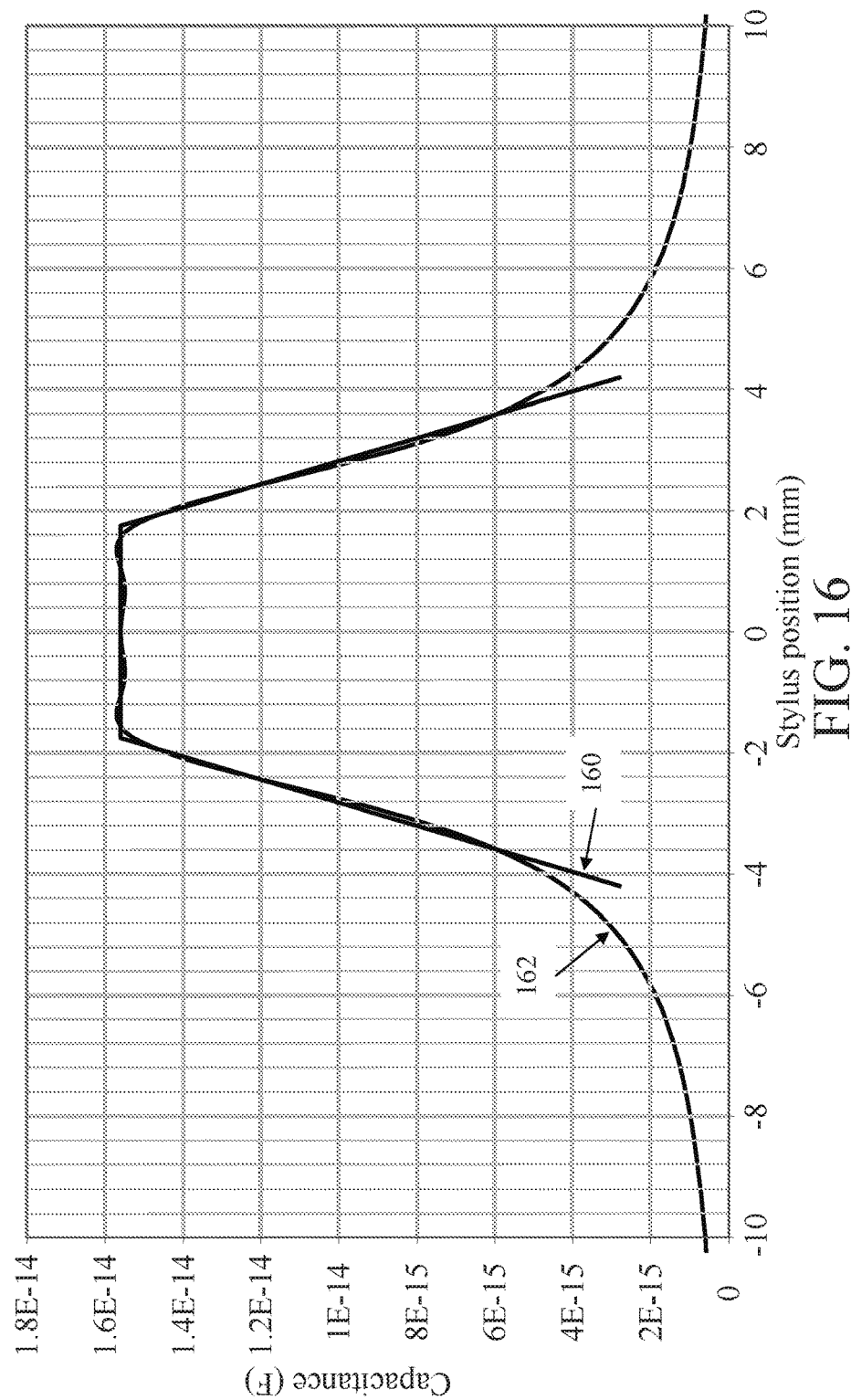
FIG. 16 shows a target profile for the dependence of capacitance on stylus position and the approximation to this characteristic which is achieved using the sub-electrode grouping shown in FIG. 15.

In FIG. 16, the plot 160 indicates the target profile for the dependence of capacitance on stylus position while the plot 162 shows the approximation to this characteristic which is achieved using the sub-electrode grouping shown in FIG. 15. This shows that by appropriately grouping the sub-electrodes it is possible to substantially modify the characteristics of the sense electrode.

Figure 17:
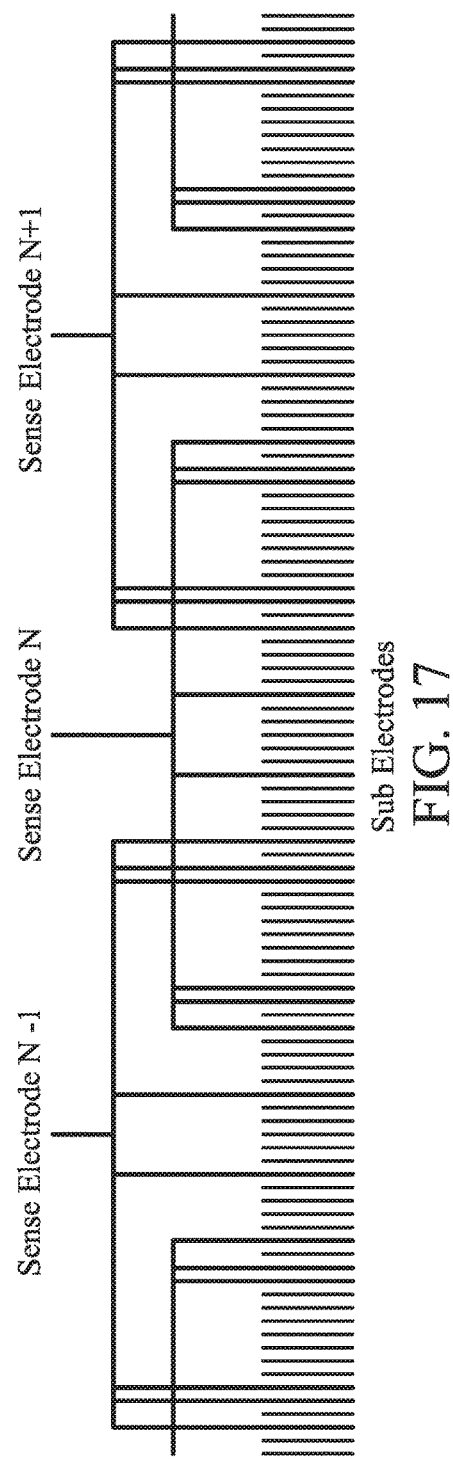
FIG. 17 shows how a number of the sub-electrode groups of FIG. 15 can be positioned parallel to one another in order to form a set of sense electrodes.

In order to sense the position of an object over an area it is necessary to use multiple sense electrodes. FIG. 17 shows how a number of the sub-electrode groups can be positioned parallel to one another in order to form a set of sense electrodes. In this example, the pitch of the sense electrodes is equal to 30 times the pitch of the sub-electrodes. Thus, the sub-electrodes are much more closely spaced than the sensing resolution. The pitch of the sense electrodes determines the sensing resolution. Furthermore, the sub-electrodes groups overlap with each other. This means that each sense electrode uses sub-electrodes spanning a certain width, and this width is greater than the distance between sense electrodes. This can be seen clearly in FIG. 17.

For this particular sub-electrode group pattern and sense electrode pitch, it is convenient that no sub-electrodes are required to be part of more than one group.

However, this does not have to be the case. Sub-electrodes can be used in multiple sense electrodes, by time multiplexing the sub-electrode between different groups or by combining the data from the sub-electrodes to form virtual groups at the signal processing stage. This is discussed further below. These measures mean that a sub-electrode can be part of two different sense electrodes, either because the sub-electrode signals are combined at different times to form the different sense electrode signals, or else because the sense electrode signals are obtained using signal processing (this is discussed further below).

Figure 18:
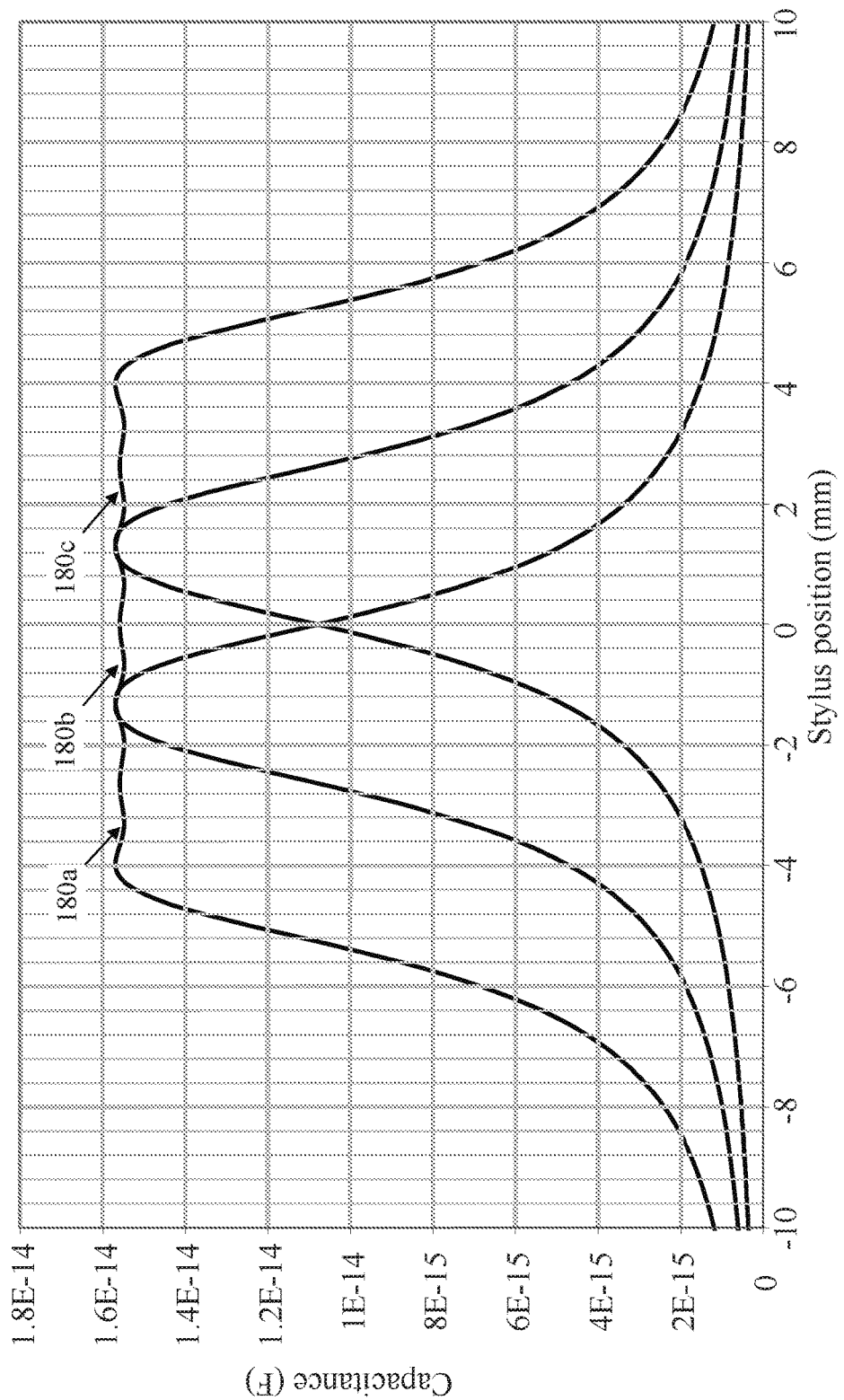
FIG. 18 shows the resulting capacitance verses object position characteristics for the three adjacent sense electrodes of FIG. 17.

An estimate of the resulting capacitance verses object position characteristics for three adjacent sense electrodes, as illustrated in FIG. 17, is shown in FIG. 18. The capacitance profile 180a, 180b and 180c associated with each sense electrode is of the same shape but is shifted in position on the horizontal axis by an amount equal to the sense electrode pitch.

The example of the capacitance verses object position profile generated by grouping sub-electrodes is purely for illustration. In practice, the choice of profile and therefore grouping may be made on criterion such as maximising the signal to noise ratio for the signals derived from the sense electrode or simplifying the signal processing required to convert the sense electrode data to object position.

In the example of the sub-electrode grouping shown, the pattern of sub-electrodes which forms a group is symmetrical about its center. However there may be occasions when it is preferable to have an asymmetrical pattern of sub-electrodes forming a group. For example, it may be beneficial to vary the pattern of the sub-electrode grouping over the area of the sensor, as an example it may be advantageous to use different sub-electrode group patterns close to the edges of the sensor in order to ensure consistent performance to the edge of the area being sensed where the sense electrode groups might be truncated.

There may be some sub-electrodes which are not used for sensing the object because they are not included in any of the sense electrode groups. Although they are not used for sensing these sub-electrodes can still be present in order to reduce the visibility of the sense electrodes by producing a electrode pattern which is uniform over the areas of the sensor. These sub-electrodes can be considered to be dummy electrodes.

As explained above, where the sensor is combined with a display this uniform repeating pattern is matched to that of the display. The unused sub-electrodes should however be electrically treated in such a way as to minimize any interference or degradation of the measurements made on the sub-electrodes which are being used for sensing. In most circumstances, this means that the unused sub-electrodes should be connected to a low impedance, for example they could be connected to ground.

In the examples above, both for adjacent groups of sub-electrodes and non-adjacent groups, it has been shown that the sub-electrodes are connected into groups with the connections between the sub-electrodes hard-wired using a conductor like a metal line or wire. Alternatively it may be sufficient to indirectly couple the sub-electrodes within the group via a capacitor or other electrical component allowing electrical charge to pass between the sub-electrodes in the group.

Furthermore it is possible to connect the sub-electrodes which form a group in a virtual manner to form virtual sense electrodes. In this case, there would not be a direct electrical connection between the sub-electrodes within the group. Instead data would be obtained from individual sub-electrodes or small groups of sub-electrodes (groups containing a smaller number of sub-electrodes than the number required to form the sense electrode) and this data would be combined in a signal processing operation to derive a signal representing the data that would be obtained from the full group of sub-electrodes. Thus, the important point is that signals for a group of sub-electrodes are combined to form a sense electrode signal, and this combination can be by physical connection or by signal processing. Thus, the device may be arranged so that not all electrodes of a group are physically connected together, and the combination of electrode signals is at least in part implemented by signal processing.

The measurements of the capacitances associated with the sub-electrodes or sub-electrode groups are preferably made simultaneously as this reduces the overall measurement time. Alternatively, the measurements may be made in a time sequential manner.

The capacitance sensing arrangement has not been described in detail, as an existing conventional arrangement can be used. The capacitor sensing arrangement is for sensing either a capacitance between pairs of electrodes, with one electrode of each sensed pair being from each electrode array, or for sensing a capacitance between an electrode and a grounded stylus.

The invention is applicable to capacitance measurement touch sensor input devices based on capacitance sensing, particularly for matrix displays, such as AMLCDs or AMOLEDs.

The electrode pitch is preferably the same as the sub-pixel pitch (i.e. the pitch of the R,G,B sub-pixels). However, it may be the same as the overall pixel pitch, as there will still be a uniform affect on each pixel. Of course, some displays may not have sub pixels, for example colour sequential displays may use the same pixels for different colours in a time sequential manner.

In some examples, the groups of electrodes used to form a sense line may extend across a large number of sub-electrodes, for example at least 3, 5 or even 8 sub-electrode lines each side of a central sub-electrode line.

Various modifications will be apparent to those skilled in the art.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch display device, comprising:
    a substrate;
    a plurality of sub-pixels disposed on the substrate; and
    a first sense electrode disposed on the substrate, wherein the first sense electrode is corresponding to the plurality of sub-pixels, and the first sense electrode comprises:
    a first sub-electrode extended along a first direction;
    a second sub-electrode extended along the first direction and adjacent to the first sub-electrode; and
    a third sub-electrode extended along the first direction and adjacent to the second sub-electrode,
    wherein the first sub-electrode, the second sub-electrode, and the third sub-electrode are directly connected, the second sub-electrode is disposed between the first sub-electrode and the third sub-electrode, there is no sub-electrode located between the first sub-electrode and the second sub-electrode, and there is no sub-electrode located between the second sub-electrode and the third sub-electrode,
    wherein a pitch between the first sub-electrode and the second sub-electrode in a second direction perpendicular to the first direction is defined as a first pitch, a pitch between the second sub-electrode and the third sub-electrode in the second direction is defined as a second pitch, and the second pitch is greater than the first pitch.

2. The touch display device as claimed in claim 1, wherein the first sense electrode further comprises a fourth sub-electrode along the first direction, the fourth sub-electrode and the first sub-electrode are directly connected, the first sub-electrode is disposed between the second sub-electrode and the fourth sub-electrode, a pitch between the first sub-electrode and the fourth sub-electrode is defined as a third pitch, and the third pitch is different from the second pitch.

3. The touch display device as claimed in claim 2, wherein the third pitch is greater than the second pitch.

4. The touch display device as claimed in claim 2, further comprising a plurality of dummy electrodes along the first direction, wherein the plurality of dummy electrodes are disposed between the first sub-electrode and the fourth sub-electrode, and the plurality of dummy electrodes are not connected to the first sub-electrode, the second sub-electrode, the third sub-electrode, and the fourth sub-electrode.

5. The touch display device as claimed in claim 1, further comprising a second sense electrode disposed on the substrate, wherein the second sense electrode is corresponding to the plurality of sub-pixels, and the second sense electrode is crossed with the first sense electrode.

6. The touch display device as claimed in claim 1, wherein the first sense electrode senses a capacitance signal which varies in a presence of a touch input.

7. The touch display device as claimed in claim 1, further comprising a plurality of color filters disposed on the substrate and corresponding to the plurality of sub-pixels.

8. The touch display device as claimed in claim 1, further comprising a display layer disposed on the substrate and corresponding to the plurality of sub-pixels, wherein the display layer comprises a liquid crystal layer.

9. The touch display device as claimed in claim 1, further comprising a display layer disposed on the substrate and corresponding to the plurality of sub-pixels, wherein the display layer comprises a plurality of organic light emission diodes.

* * * * *